US006374651B1

(12) United States Patent
Thielmann et al.

(10) Patent No.: US 6,374,651 B1

(45) Date of Patent: Apr. 23, 2002

(54) CLOSING DEVICE FOR A CONTROL CABINET DOOR, MACHINE CASING OR SUCH LIKE

(75) Inventors: Bodo Thielmann, Merkenbach; Frank Küster, Breitscheid, both of (DE)

(73) Assignee: Rittal-Werk Rudolf Loh GmbH & Co. KG, Herborn (DE)

(*) Notice: Subject to any disclaimer, the term of this patent is extended or adjusted under 35 U.S.C. 154(b) by 0 days.

(21) Appl. No.: 09/601,921

(22) PCT Filed: Jan. 22, 1999

(86) PCT No.: PCT/EP99/00432

§ 371 Date: Oct. 24, 2000

§ 102(e) Date: Oct. 24, 2000

(87) PCT Pub. No.: WO99/43914

PCT Pub. Date: Sep. 2, 1999

(30) Foreign Application Priority Data

Feb. 27, 1998 (DE) ........................................ 198 08 270

(51) Int. Cl.[7] ................................................ E05B 47/06

(52) U.S. Cl. .......................... 70/210; 70/278.7; 70/283; 292/39; 292/142; 292/144; 292/150

(58) Field of Search ....................... 70/283, 210, 278.7, 70/277, 283.1, 278.1, 278.2, 278.3, 278.6, 280–282; 292/39, 142, 144, 150

(56) References Cited

U.S. PATENT DOCUMENTS 442,198 A * 12/1890 Palmer ....................... 292/144
1,054,112 A * 2/1913 Handschuh ................. 292/144
1,060,317 A * 4/1913 Bywater et al. ........ 292/144 X
1,804,387 A * 5/1931 Dorsey et al. ................ 70/282
1,833,572 A * 11/1931 Hardesty ..................... 70/283
2,149,695 A * 3/1939 Wilhelm ..................... 292/144
2,450,052 A * 9/1948 Marple ................... 292/144 X
2,786,701 A * 3/1957 Porlich ....................... 292/144
2,910,859 A * 11/1959 Allen et al. ................... 70/283
3,627,960 A * 12/1971 Grabek ................... 292/144 X
4,212,489 A * 7/1980 Snyder ................... 292/144 X (List continued on next page.)

FOREIGN PATENT DOCUMENTS

| | | | |
|---|---|---|---|
| DE | 187328 | * 6/1907 | ................. 292/144 |
| DE | 9402208.9 | * 5/1994 | |
| DE | 29507654 U1 | * 10/1996 | |
| DE | 19613196 | * 10/1997 | |
| EP | 96400 | * 12/1983 | .................. 70/283 |
| FR | 545475 | * 7/1922 | ................. 292/144 |
| FR | 559461 | * 6/1923 | ................. 292/144 |
| FR | 723137 | * 1/1932 | .................. 292/39 |
| FR | 76717 | * 10/1961 | ................. 292/142 |
| GB | 11310 | * 5/1904 | .................. 292/39 |
| SU | 127587 | * 7/1959 | ................. 292/144 |
| WO | WO89/02967 | * 4/1989 | |

*Primary Examiner*—Lloyd A. Gall
(74) *Attorney, Agent, or Firm*—Pauley Petersen Kinne & Erickson

(57) ABSTRACT

A closing device for a control cabinet door, machine casing or the like, having a security unit with a lock attached to the control cabinet door, machine casing or the like, with a first locking part and a second locking part fixed to the door frame, machine frame or the like. The two locking parts can be made to cooperate with each other or not by application of an electric signal. In a closing device there is a locking and unlocking mechanism suitable for use with all usual types of lock. Thus a lock is used which has a locking mechanism that can be rotated in different directions and in which a locking member subjected to a spring tension is movably guided. In addition, when in a locked position the locking member subjected to a spring tension prevents the rotation of the locking mechanism. A release member can be displaced by an electromagnet mounted on the door frame or machine frame and makes it possible to move the locking member in the lock into a locking position which permits rotation of the locking mechanism.

14 Claims, 2 Drawing Sheets

U.S. PATENT DOCUMENTS

| | | | | | |
|---|---|---|---|---|---|
| 4,227,732 A | * | 10/1980 | Kish | 292/144 X |
| 4,355,830 A | * | 10/1982 | Rau, III | 292/144 |
| 4,529,234 A | * | 7/1985 | Senfen | 292/150 X |
| 5,029,912 A | * | 7/1991 | Gotanda | 292/144 X |
| 5,094,483 A | * | 3/1992 | James | 292/39 |
| 5,224,707 A | * | 7/1993 | Martin | 70/280 X |
| 5,636,536 A | * | 6/1997 | Kinnucan | 292/144 X |
| 5,664,811 A | * | 9/1997 | Martus et al. | 292/144 |
| 6,035,674 A | * | 3/2000 | Nickel | 292/142 X |
| 6,076,384 A | * | 6/2000 | Thielmann et al | 70/210 |
| 6,076,385 A | * | 6/2000 | Pedroso et al | 70/277 X |

* cited by examiner

CLOSING DEVICE FOR A CONTROL CABINET DOOR, MACHINE CASING OR SUCH LIKE

BACKGROUND OF THE INVENTION

1. Field of the Invention

This invention relates to a closing device for a switchgear cabinet door, machine casing, or the like, having a securing device, including a lock attached to the switchgear cabinet door, machine casing, or the like, with a first locking element, and a second locking element fastened on the door frame, machine casing frame, or the like, wherein both locking elements can be brought into functional contact with each other and again out of functional contact under the control of an electrical signal.

2. Description of Related Art

A closing device is used for security reasons wherever defined prerequisites for releasing the opening process of the switchgear cabinet door, or machine casing, or the like, must be observed, for example switching off the supply voltage, or the like.

Such a closing device is known from German Patent Reference DE 295 07 654 U1. Here, a so-called pivot lever closing device is employed, and locking takes place by the pivot lever, which must be placed into its initial position in a lock recess for this purpose. This results in a considerable intervention in the closing device, i.e. a considerable change of the lock mechanism.

SUMMARY OF THE INVENTION

It is one object of this invention to create a closing device of the type mentioned at the outset, which permits locking in the closed position in a considerably simpler way, and which can be applied to all customary types of locks.

In accordance with this invention, this object is attained using a lock with a locking mechanism, which can be placed in different directions of rotation. A locking member, which is subjected to spring tension, is displaceably guided. In one locking position the locking member under spring tension blocks the rotating movement of the lock mechanism, and a trigger member can be displaced by an electromagnet attached to the door frame or the machine casing frame, by which the locking member in the lock can be placed into an unlocking position which releases the rotating movement of the lock mechanism.

Conventional locks have a lock mechanism which can be placed into a rotating movement. The locking and unlocking of the lock can be controlled from the switchgear cabinet or the machine using an electrically controlled trigger member with the adjustable locking member in the lock and only needs to work together with the lock mechanism which can make rotating movements. This locking and unlocking mechanism can be applied to all types of locks without it being necessary to essentially change the actual locking mechanism.

The functional connection between the locking member and the trigger member can be achieved in a simple manner because on the side facing the door frame or the machine casing frame, the locking member is accessible through an opening in the lock housing and is adjustably guided in this opening. In the locked position a compression spring keeps the locking member, which has detents, in place in the opening.

In the closing device the locking member acts together with a cam disk of the locking mechanism, which has a flat place for supporting it on the locking member and for maintaining the locked position. Outside of the flat place the cam disk partially covers the opening and keeps the locking member in this position when the locking member is placed into the unlocked position in order to obtain the required functional connection between the locking element and the locking mechanism. Here, the lock mechanism includes a lock actuating element, a pinion for a pair of push rods for improving the locked position, the cam plate, and a turnbuckle, all of which are connected with each other, fixed against relative rotation. The turnbuckle participates in the locking process of the switchgear cabinet door or machine casing.

In accordance with one embodiment, for the displacement of the trigger member the electromagnet is attached to a bracket fastened on the door frame or the machine casing frame and controls a draw-in plate with a displacement rod. The displacement rod is conducted through openings of systematic rows of holes of the door frame or the machine casing frame. An end of the displacement rod projecting out of the door frame or the machine casing frame supports the trigger member. In this case the draw-in plate is guided, fixed against relative rotation, in openings of the door frame or the machine casing frame by guide bolts. This function also applies to the displacement rod with the trigger member, so that the trigger member can always act together in the same position with the locking member.

For one, the control of the locking and unlocking mechanism can be laid out in such a way that, when the electromagnet is excited, the trigger member brings the locking members of the lock into the unlocking position when the switchgear cabinet door or the machine casing is closed. After setting the lock into the locking position and with the electromagnet switched off, the compression spring in the lock puts the locking member into the locking position. In another embodiment when the electromagnet is not excited, a compression spring maintains the trigger member in the unlocking position. When closing the switchgear cabinet door or the machine casing, the locking member in the lock is maintained in the unlocked position, and after setting the lock into the lock position, with the electromagnet excited, the compression spring in the lock places the locking member into the locking position.

BRIEF DESCRIPTION OF THE DRAWINGS

This invention will be explained in greater detail in view of preferred embodiments shown in the drawings wherein.

DESCRIPTION OF PREFERRED EMBODIMENTS

Figure 1:
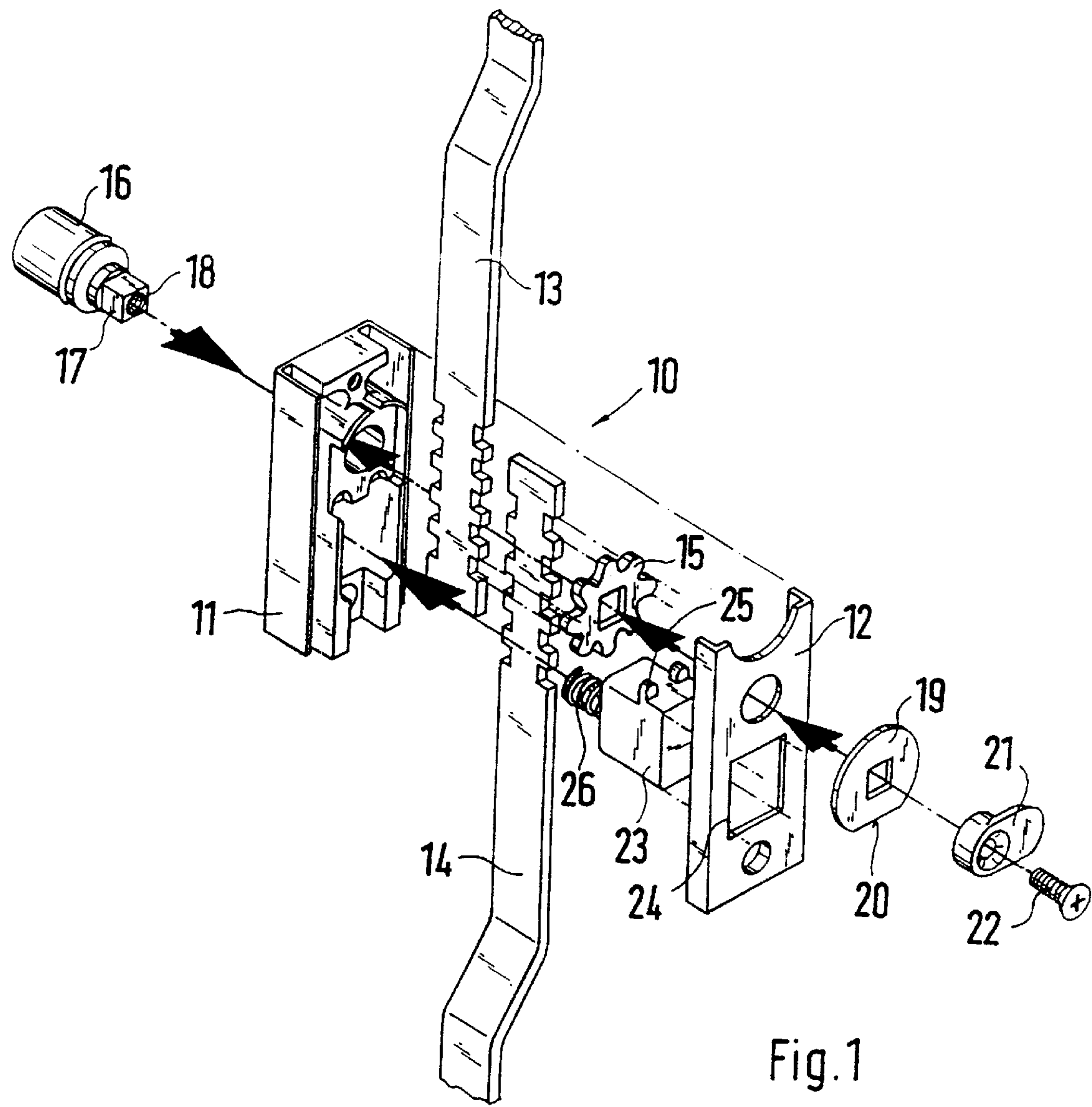
FIG. 1 is an exploded perspective view of a lock employed for the closing device and having a locking member.

A lock 10 is shown in FIG. 1, which has a locking member 23, by means of which the lock 10 can be locked after the locking operation. In the embodiment shown in FIG. 1, the lock 10 is designed as a push rod lock, with a lock mechanism that includes a lock actuating element 16, a pinion 15 for displacing the push rods 13 and 14, and a turnbuckle 21. Here, the lock mechanism is rotatably maintained in the lock housing, which can comprise the housing elements 11 and 12. A square projection 17 of the lock actuating element 16 receives the pinion 15 in a manner fixed against relative rotation and is provided with the cam disk 19 prior to the turnbuckle 21 being placed on the square projection 17 projecting from the housing element 12. With the screw 22 the turnbuckle 21 is screwed together with the threaded receiver 18 in the square projection 17 of the lock actuating element 16. In the process the lock mechanism is simultaneously fastened on the lock housing and is rotatably seated. The lock 10 can be designed differently, in particular as far as the lock actuating element 16 is concerned. However, in conventional locks an element can be rotated in both directions of rotation and can be blocked and released in the directions of rotation.

Figure 2:
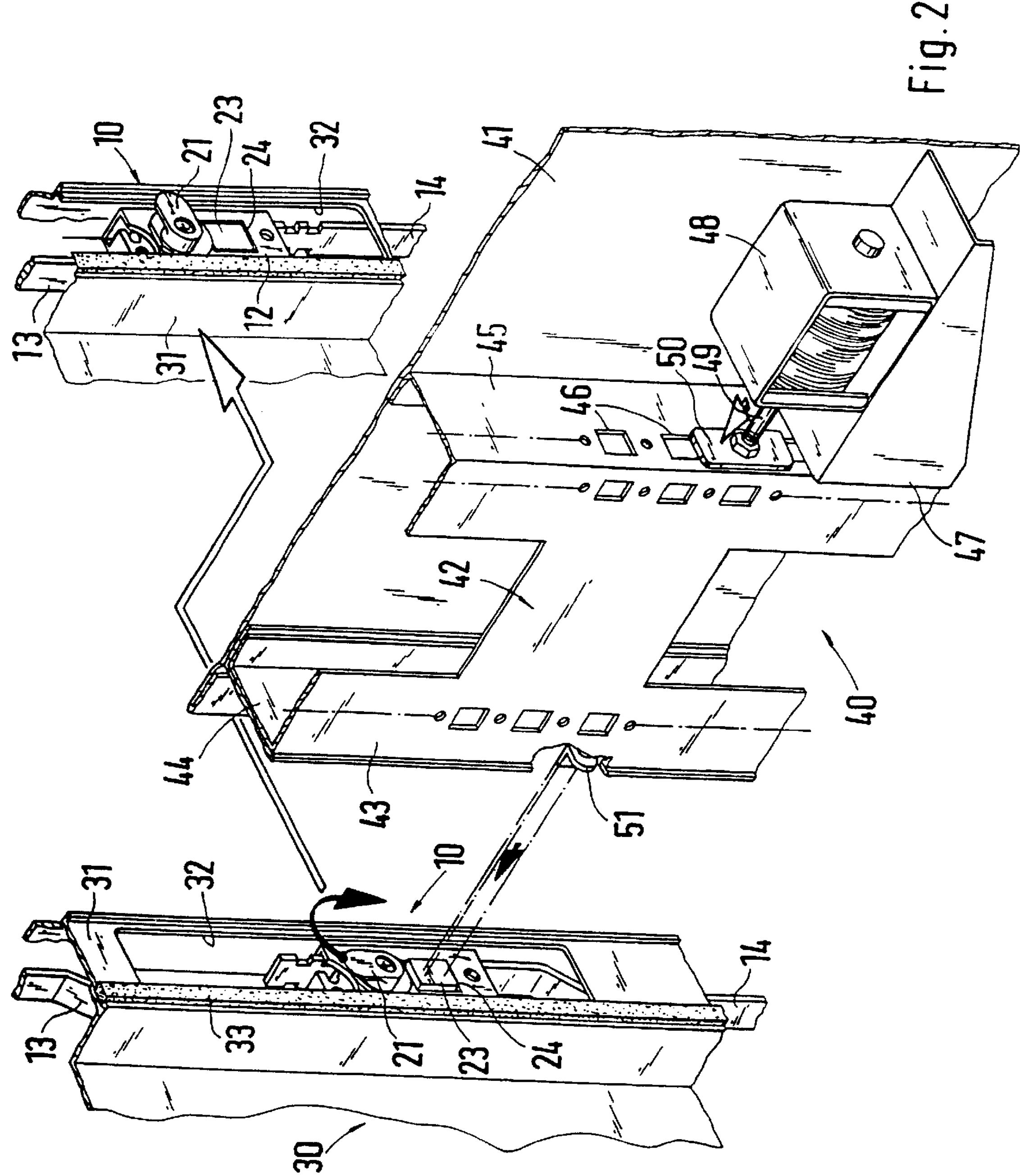
FIG. 2 is an exploded perspective view of an example of a switchgear cabinet, the locking and unlocking process of which can be performed by the closing device of this invention.

The lock housing receives a locking member 23, which is supported in the lock housing by a compression spring 26 so that it partially projects from an opening 24 in the housing element 12, which faces the door frame 42 or the machine casing frame in FIG. 2. This position of the locking member 23 is the locking position, in which the lock mechanism is set so that the flat place 20 of the cam disk 19 rests on the locking member 23, and the detents or cams 25 of the released locking member 23 engaged the gear wheel and prevent the locking mechanism from rotating. Detents 25 ofthe locking member 23 rest against the inside ofthe housing element 12.

For unlocking it is necessary to displace the locking member 23 sufficiently far into the lock housing so that the areas outside of the flat place 20 of cam disks 19 rest in front of the opening 24 and hold the locking member 23 in the unlocking position.

As FIG. 2 shows, the lock 10 is installed in a profiled frame section 31 of the cabinet door 30 or of the machine casing. The profiled frame section 31 can be an applied frame leg or can be beveled off on the switchgear cabinet door or the machine casing. The side of the profiled frame section 31 facing the door frame 42 or the machine casing has an opening 32 for installing the lock 10, in which the locking member 23 and the turnbuckle 21 are accessible. The turnbuckle 21 can also be used for the locking process, so that at least three locked positions are obtained with the two push rods 13 and 14. A sealing element 33 on the profiled frame section 31 can take care of sealing.

The door frame 42 of the switchgear cabinet 40 is fastened on a lateral wall 41, and has systematic rows of holes with openings 46 in the sides 43, 44 and 45. An electromagnet 48 is fastened on a bracket 47, which is screwed to the door frame 42 or the machine casing frame. The electromagnet 48 displaces a displacement rod 49, which supports a draw-in plate 50 forming a pole plate. The displacement rod 49 is conducted through openings 46 in the sides 44 and 45 of the door frame 42, and on its end is connected with the trigger member 51. When closing the cabinet door 30, the locking member 23 is displaced into the unlocking position in the lock 10 by means of the trigger member 51, so that the lock mechanism can be rotated into the locking position. When the trigger member 51 releases the locking member 23 by being moved back in the direction toward the door frame 42 or the machine casing frame, the compression spring 26 in the lock 10 sets the locking member 23 into the locking position, wherein the cam disk 19 is supported with a flat place 20 on the portion of the locking member 23 which partially projects out of the opening 24, and prevents a rotating movement of the locking mechanism.

The draw-in plate 50 on the displacement rod 49 can be used as the pole plate of the electromagnet 48 and is guided, fixed against relative rotation, by means of guide bolts in openings of the door frame 42 or the machine casing frame. Thus the trigger member 51 at the end of the displacement rod 49 also works together with the locking member 23 in the lock 10, always in the same position.

The control of the electromagnet 48 for one can be such that the trigger member 51 brings the locking member 23 into the unlocking position when the switchgear cabinet door 30 or machine casing is being closed. After placing the lock 10 into the locking position and with the excitation of the electromagnet 48 switched off, the compression spring 26 in the lock 10 puts the locking member 23 into the locking position.

However, the control of the electromagnet 48 can also be provided such that with the electromagnet 48 not excited, a compression spring maintains the trigger member 51 in the unlocking position. While closing the switchgear cabinet door 30 of the machine casing, the locking member 23 in the lock will then remain in the unlocking position. After the excitation of the electromagnet 48 is switched on, the compression spring 26 in the lock 10 places the locking member 23 into the locking position.

What is claimed is:

1. In a closing device for a switchgear cabinet door or a machine casing, having a securing device with a lock attached to the switchgear cabinet door or machine casing, with a first locking element, and a second locking element fastened on a door frame or a machine casing frame, wherein the first locking element and the second locking element can be brought into functional contact with each other and out of functional contact with each other under control of an electrical signal, the improvement comprising:

a lock (10) with a locking mechanism (16, 15, 19, 13) positionable in a plurality of directions of rotation, a locking member (23) subjected to a spring tension and displaceably guided in the lock (10);

in one locking position the locking member (23) under spring tension blocking a rotating movement of the locking mechanism (16, 15, 19, 13);

a trigger member (51) displaceable by an electromagnet (48) attached to the door frame (42) or the machine casing frame by which the locking member (23) in the lock (10) is positioned into an unlocking position which releases the rotating movement of the locking mechanism (16, 15, 19, 13); and the lock (10) being a push rod lock with the locking mechanism having a lock actuating element (16) and a pinion (15) displacing two push rods (13 and 14), and in a position preventing rotation of the locking mechanism the locking member (23) having a plurality of detents (25) engaging the pinion (15).

2. In the closing device in accordance with claim 1, wherein on a side facing the door frame (42) or the machine casing frame the locking member (23) is accessible through an opening (24) in a lock housing (11, 12) and is adjustably guided in the opening (24), and in a locked position a compression spring (26) keeps the locking member (23) with the detents (25) in the opening.

3. In the closing device in accordance with claim 2, wherein the locking member (23) acts together with a cam disk (19) of the locking mechanism, the cam disk (19) has a flat place (20) for supporting the cam disk (19) on the locking member (23) and for maintaining the locked position, and outside of the flat place (20) the cam disk (19) partially covers the opening (24) and maintains the locking member (23) in the unlocked position when the locking member (23) is placed into the unlocked position.

4. In the closing device in accordance with claim 3, wherein the locking mechanism comprises the lock actuating element (16) the pinion (15) for the push rods (13, 14), the cam disk (19), and a turnbuckle (21) all connected with each other and fixed against relative rotation.

5. In the closing device in accordance with claim 4, wherein the electromagnet (48) is attached to a bracket (47) fastened on the door frame (42) or the machine casing frame and controls a draw-in plate (50) with a displacement rod (49), the displacement rod (49) is conducted through openings (46) of systematic rows of holes of the door frame (42) or the machine casing frame, and an end of the displacement rod (49) projecting out of the door frame (42) or the machine casing frame supports the trigger member (51).

6. In the closing device in accordance with claim 5, wherein the draw-in plate (50) the displacement rod (49) with the trigger member (51) are adopted to be guided and fixed against relative rotation by guide bolts in openings of the door frame (42) or the machine casing frame.

7. In the closing device in accordance with claim 6, wherein with the electromagnet (48) excited the trigger member (51) brings the locking member (23) of the lock (10) into the unlocking position when the switchgear cabinet door (30) or the machine casing is closed, and after setting the lock (10) into the locking position and with the electromagnet (48) switched off, the compression spring (26) in the lock (10) positions the locking member (23) into the locking position.

8. In the closing device in accordance with claim 6, wherein with the electromagnet (48) unexcited a compression spring maintains the trigger member (51) in the unlocking position, when closing the switchgear cabinet door (30) or the machine casing the locking member (23) in the lock (10) is maintained in the unlocked position, and after setting the lock (10) into the locked position and with the electromagnet (48) excited, the compression spring (26) in the lock (10) positions the locking member (23) into the locking position.

9. In the closing device in accordance with claim 1, wherein the locking member (23) acts together with a cam disk (19) of the locking mechanism, the cam disk (19) has a flat place (20) for supporting the cam disk (19) on the locking member (23) and for maintaining the locked position, and outside of the flat place (20) the cam disk (19) partially covers an opening (24) in a lock housing (11, 12) and maintains the locking member (23) in the unlocked position when the locking member (23) is placed into the unlocked position.

10. In the closing device in accordance with claim 1, wherein the locking mechanism comprises the lock actuating element (16), the pinion (15) for the push rods (13,14), a cam disk (19), and a tumbuckle (21) all connected with each other and fixed against relative rotation.

11. In the closing device in accordance with claim 1, wherein the electromagnet (48) is attached to a bracket (47) fastened on the door frame (42) or the machine casing frame and controls a draw-in plate (50) with a displacement rod (49), the displacement rod (49) is conducted through openings (46) of systematic rows of holes of the door frame (42) or the machine casing frame, and an end of the displacement rod (49) projecting out of the door frame (42) or the machine casing frame supports the trigger member (51).

12. In the closing device in accordance with claim 11, wherein the (draw-in plate (50) and the displacement rod (49) with the trigger member (51) are adapted to be guided and fixed against relative rotation by guide bolts in openings of the door frame (42) or the machine casing frame.

13. In the closing device in accordance with claim 1, wherein with the electromagnet (48) excited the trigger member (51) brings the locking member (23) of the lock (10) into the unlocking position when the switchgear cabinet door (30) or the machine casing is closed, and after setting the lock (10) into the locking position and with the electromagnet (48) switched off, a compression spring (26) in the lock (10) positions the locking member (23) into the locking position.

14. In the closing device in accordance with claim 1, wherein with the electromagnet (48) unexcited a compression spring maintains the trigger member (51) in the unlocking position, when closing the switchgear cabinet door (30) or the machine casing the locking member (23) in the lock (10) is maintained in the unlocked position, and after setting the lock (10) into the locked position and with the electromagnet (48) excited, the compression spring (26) in the lock (10) positions the locking member (23) into the locking position.

* * * * *